June 29, 1926. 1,590,873
S. APOSTOLOFF
PRIMARY CELL
Original Filed June 10, 1921
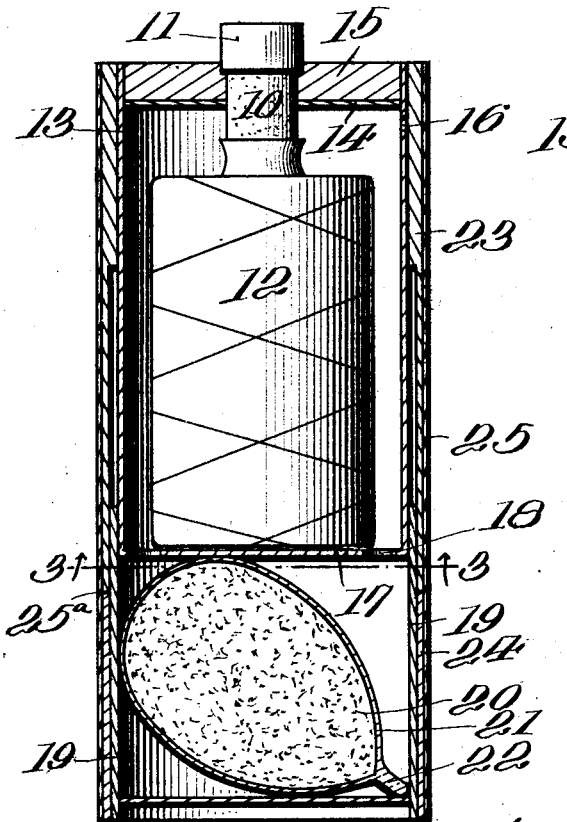
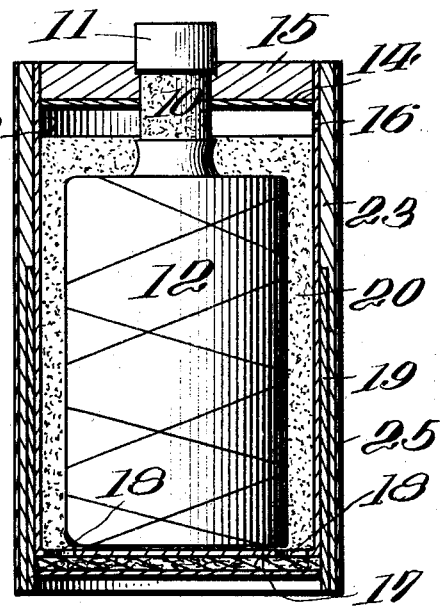
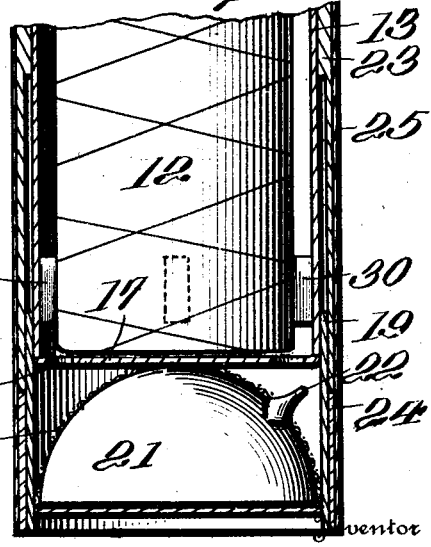
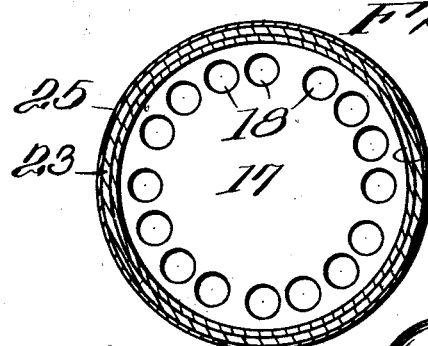
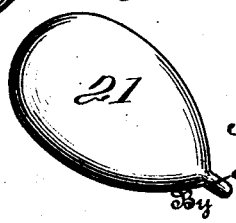
SERGE APOSTOLOFF.
K. P. McElroy
His Attorney Patented June 29, 1926.

1,590,873

UNITED STATES PATENT OFFICE.

SERGE APOSTOLOFF, OF BROOKLYN, NEW YORK, ASSIGNOR TO UNION DRY BATTERY CORPORATION OF AMERICA, OF NEW YORK, N. Y., A CORPORATION OF DELAWARE.

PRIMARY CELL.

Continuation of application Serial No. 476,537, filed June 10, 1921. This application filed February 25, 1925. Serial No. 11,468.

My invention relates to primary cells; and it comprises a cell having electrolyte in a brittle, readily crushed container; this electrolyte being a liquid, semi-liquid or pasty corrosive substance such as is used as an electrolyte in primary electric cells of the dry or semi-dry type; the container being adapted to be readily crushed and disintegrated or pulverized when the electric cell is wanted. The object is to retain the original efficiency of the electrolyte irrespective of the length of time intervening between the manufacture of the cell and its being put into use. It is well known that ordinary dry cells are subject to deterioration after manufacture, that is, suffer a so-called "shelf loss", while awaiting sale or use owing to the slow action of the electrolyte on the other elements of the cell as well as to evaporative and other changes which it itself undergoes. To avoid this objectionable feature, I confine the electrolyte in a separate container which prevents, during the time between the manufacture and use of the cell, contact of the electrolyte with the battery parts on which it acts. This container has special characteristics, as will be explained below, and is of brittle frangible nature adapted to be crushed at or immediately before the time of use, thereby allowing the contents to escape from the container and to come into contact with the substance or surface to be acted upon. The container I ordinarily make of thin walled blown glass and of globular shape. When it is broken the powder resulting remains inert and harmless. By using a spherical or flask-like container of thin blown glass I not only lessen the amount of this inert material but produce a structurally strong container which, however, readily disintegrates into minute pieces or powder.

I shall now proceed to describe two preferred and satisfactory embodiments of my invention as illustrated by the accompanying drawings, in which:

Figure 1 is a vertical section of a primary cell, with the electrolyte within the uncrushed temporary protecting container;

Figure 2 shows the same cell in active condition as it is after the said container has been crushed and the escaping electrolyte has come in contact with the electrodes;

Figure 3 is a horizontal section along line 3—3 of Figure 1;

Figure 4 is an outside view of the temporary electrolyte container; and

Figure 5 is a partial fragmental view like that of Figure 1, but showing a flask-like container with a flattened bottom.

The particular cell illustrated by Figs. 1, 2 and 3 comprises a carbon electrode 10 with the usual terminal cap 11 and a cartridge 12 containing a depolarizing mass such as manganese dioxid. The outer electrode 13 as shown consists of a cylindrical sleeve or can of zinc. The upper end of the carbon electrode is held in position by a washer 14 of cardboard or other insulating material, and by a pitch seal 15. The zinc sleeve 13, as shown, has a vent 16 located below the washer 14, for a purpose to be stated hereinafter. As shown zinc electrode 13 has the form of a can with a perforated integral bottom 17. This bottom may however be of fiber or other suitable material secured rigidly to the zinc body. The object is to provide a container having openings or passages 18 by which the chamber above the said bottom communicates with the space below the bottom for a purpose later appearing. The electrode 13 has a telescopic sliding fit into and with a short lower cup 19 which may also be made of zinc, in which case both the sleeve 13 and the cup 19 will form part of the outer electrode when the cell is put in action.

The electrolyte 20 which may be of any usual or approved character employed in this type of cells, such as a solution of zinc chlorid and ammonium chlorid gelatinized by starch, is placed within a special temporary container 21. The electrolytes used in these cells are always of corrosive nature as regards zinc; a fact, of course, to which they owe their utility; but unfortunately they commonly have more or less action upon the zinc even on open circuit this being one of the sources of "shelf loss". The temporary container 21 is of brittle crushable and pulverizable material and is a thin-walled blown glass bulb. As shown in Figs. 1 and 4 it is of egg-shape and is placed eccentrically in the cell. As shown in Fig. 5 it is flask shape having a flattened bottom on which it rests. In either event it is so blown as to leave a tip 22 through which electrolyte is introduced; this tip being afterwards sealed off over the lamp in a well understood way. It is desirable that the electrolyte fill the bulb substantially completely, leaving but little air space. When the temporary container is placed in the cup 19, as indicated in Figure 1, it is desirable to put the sealing point 22 downward, and near the side wall of the cup with the central portion of the bottom 17 in tangential contact with the egg-shaped body of the container 21. The cell has a carton or shell or outside container consisting of an upper part 23, a lower part 24, both preferably made of fibrous insulating waterproof material, and an exterior label or wrapper 25 which also serves to hold the cell elements in inactive position.

Assuming that the cell is sold in the condition represented by Figure 1, the following procedure is employed when the cell is to be put into use: The pasted wrapper or instruction label 25 is severed along the meeting line of the parts 23 and 24, (as shown by the heavy line 25ª in Figure 1) whereupon the lower part 24 may be removed and discarded. The cup 19 is then telescoped upon the sleeve 13, as by pressing the upper part of the cell downward while the bottom of the cup 19 rests on a table or other support. The bottom 17 will thus exert pressure on the electrolyte container 21, which rests on the bottom of the said cup 19, and such pressure will break the container 21, the first fracture, generally occurring at the point 22 which is so located as to break off readily (Fig. 1). As the telescoping action continues, the container 21 is crushed or broken up entirely, largely into very small pieces; actually it is usually pulverized. With a thin-walled blown glass bulb, once the bulb is broken the glass particles are readily comminuted and the volume they occupy is inappreciable. The electrolyte liberated by the breaking of the container 21 is forced up through the openings or passages 18 and thus comes into contact with both electrodes as indicated in Figure 2, the air in the cell being compressed, and the excess escaping from the upper part of the sleeve 13 through the vent 16. The cell is then ready for use. Any glass pieces which are small enough to pass through the openings 18 together with the electrolyte, do not interfere with the action of the latter. Larger pieces which will not pass through the opening are broken up. The bottom 17 should be strong or stiff enough to prevent its bending or buckling upward when pressed down upon the container 21 as described; since such buckling might cause the bottom 17 to bear against the cartridge 12 or the electrode 10 and loosen the latter from the pitch seal 15. With a thin-walled blown glass bulb however the strength required of 17 is small. It will be noted that while the cell is in the inactive condition, Figure 1, for shipment, storage, etc., the temporary electrolyte container 21 is held against lateral movement relatively to the other parts of the cell, and against vertical movement as well, thus guarding against the accidental breaking of said container which might occur if said container were free to move about in the cup 19. The material (glass) of which the container 21 is made, is not affected by the electrolyte, nor does such material exert any chemical action whatsoever, on the electrolyte; furthermore, such material is impervious to air and to liquids, and therefore the electrolyte 20 will be preserved indefinitely, without any evaporation or other deterioration, as long as the container 21 remains unbroken. On the other hand, glass and particularly blown glass, of the nature of the thin blown bulbs used here is a brittle and practically rigid material which will break and readily become pulverized when the temporary container 21 is crushed as explained above.

Of course, instead of placing the electrolyte cartridge 20, 21, 22 inside the cell as sold (Figure 1) such cartridge might be placed in a separate box or other container, and brought into relation to the cell only when the latter is to be put into use. In this case, the lower part 24, and the corresponding portion of the wrapper 25 may be dispensed with. The empty cell will be originally assembled in the collapsed condition shown in Figure 2, but of course without the eletrolyte 20. In assembling a cell under these conditions, the outer container 23 (Fig. 2) is first slipped off, the cup 19 removed and a cartridge 20, 21, 22 placed in such cup. To activate the cell, the cup 19 is replaced in contact with the electrode 13, and the container 21, 22 broken by telescopic action as described above, whereupon the cell is ready to deliver current. If desired, the outer container 23 may then be slipped into position again.

Both the hemispherical glass container shown in Fig. 5 and the egg-shaped container shown in the other views have specific advantages. The hemispherical construction is somewhat less breakable in transit and handling and crushes somewhat differently from the egg-shaped. For one thing, it usually leaves a bottom layer of glass to act as an insulating layer. If it be desired the glass bulb in either form of construction may be covered with thin cheese cloth or something similar to form a bag 29 holding the fragments of glass. As shown in Figs. 1 and 2 the centering of the bobbin 12 is maintained by carbon pole piece 10. As shown in Fig. 5 it is sometimes advantageous to use special centering means which may consist, as there shown, in three or more pieces of glass rod or tubing 30 between the zinc container and the central bobbin. They act as guides keeping the bobbin in the center. Bits of wood, cardboard or fiber may be used in lieu of glass rods.

This application is a continuation of prior application Serial No. 476,537, filed June 10, 1921.

What I claim is:

1. In an inactive battery cell adapted for activation and having an outside container and a contained electrode therewithin, the location of said electrode in the inactive condition being such as to provide a cavity below said electrode, a bulb-like, imperforate and brittle glass vessel containing electrolyte located within said cavity in the inactive condition of the cell and adapted upon movement of said electrode to be crushed and completely disintegrated to activate said cell, said cavity disappearing with the disintegration of the glass vessel.

2. In an inactive battery cell capable of activation, a container having a permanent chamber and a temporary chamber, electrodes within the permanent chamber and a bulb-like brittle sealed glass vessel containing electrolyte within the temporary chamber whereby upon forcing the permanent chamber into the temporary chamber said bulb-like vessel will disintegrate, the temporary chamber become obliterated and the cell become active.

3. In an inactive battery cell capable of activation and comprising negative and positive electrodes and depolarizing material, a sealed flask-like blown glass container having a flattened bottom and containing electrolyte located below certain of the recited elements and capable of complete disintegration by movement thereof.

4. In an inactive battery cell capable of activation and comprising negative and positive electrodes and depolarizing material, a sealed flask-like blown glass container and containing electrolyte located below certain of the recited elements and capable of complete disintegration by movement thereof.

5. In an inactive battery cell capable of activation, a positive electrode, a negative electrode and depolarizing material, means for temporarily holding the recited elements in an elevated position and a cloth covered blown glass bulb containing electrolyte located beneath said elements and adapted upon downward movement of the same for pulverization of the glass and liberation of the electrolyte.

In testimony whereof, I have hereunto affixed my signature.

SERGE APOSTOLOFF.